May 26, 1964     S. B. HANSSEN     3,134,451
PLATFORM TYPE BATHROOM SCALE
Filed March 14, 1962     2 Sheets-Sheet 1
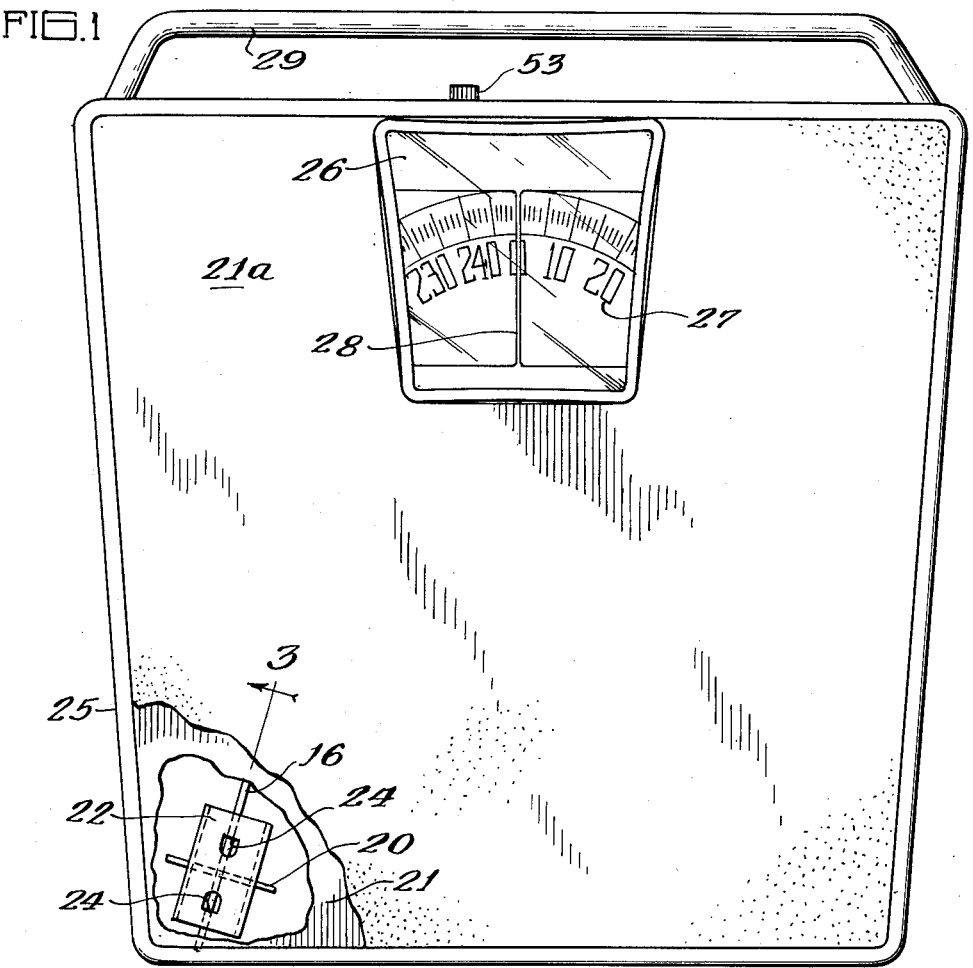
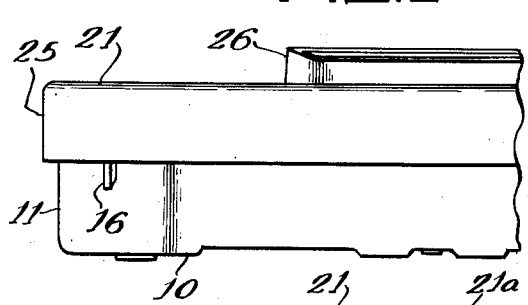
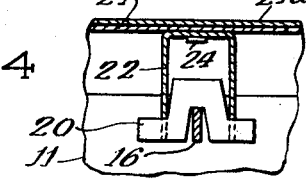
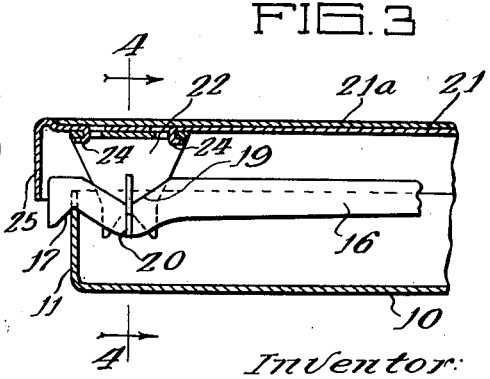
Inventor:
Stan B. Hanssen
By: Hofgren, Brady, Wegner,
Allen & Stellman
Attorneys

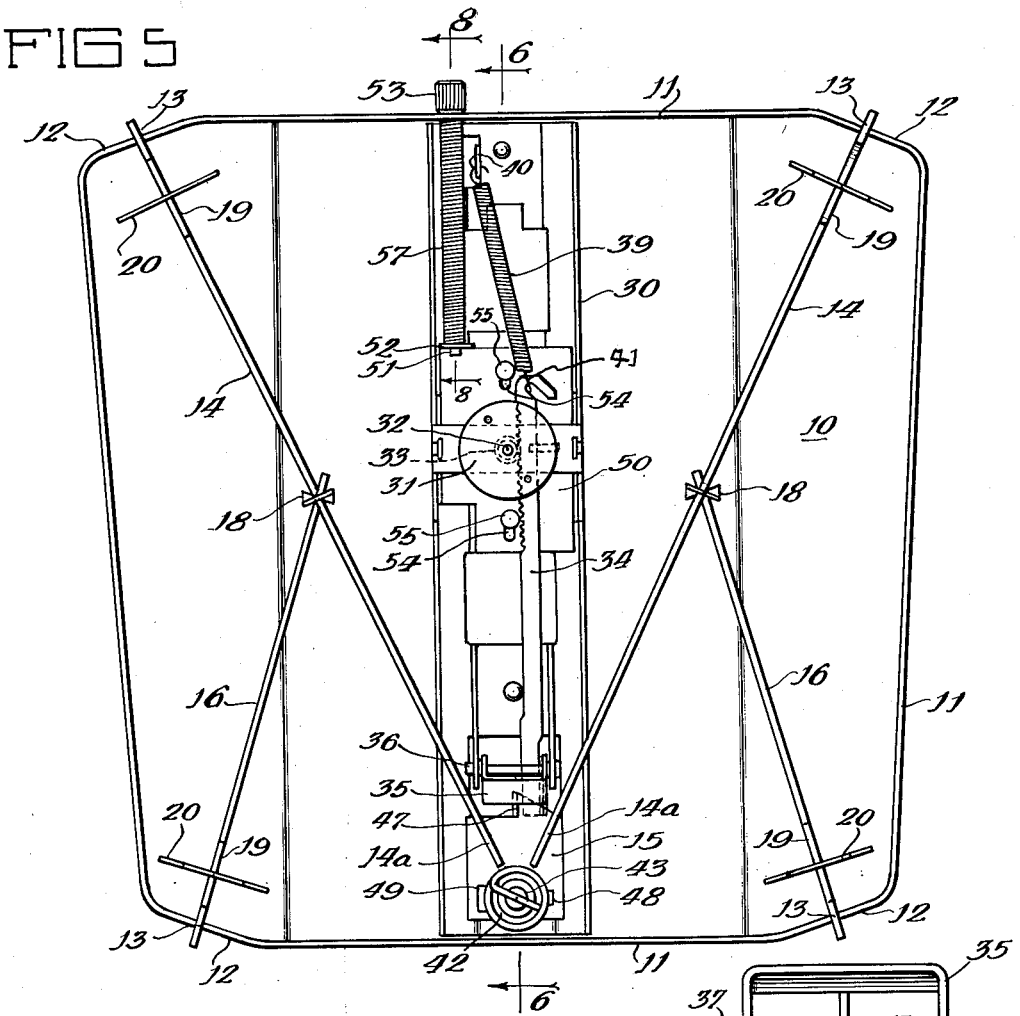
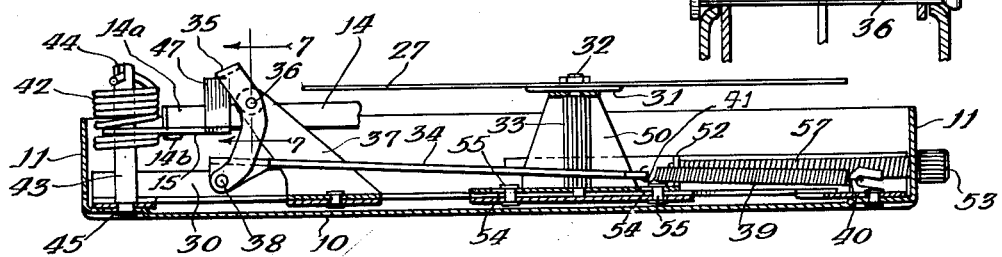
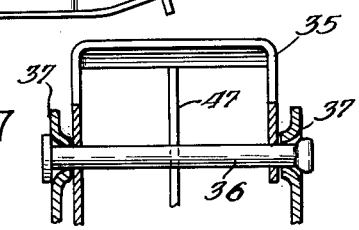
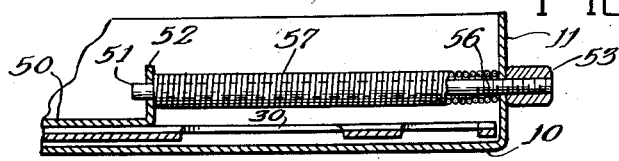

United States Patent Office 3,134,451
Patented May 26, 1964

3,134,451
PLATFORM TYPE BATHROOM SCALE
Stan B. Hanssen, Kenilworth, Ill., assignor to Hanson Scale Company, a corporation of Illinois
Filed Mar. 14, 1962, Ser. No. 179,698
10 Claims. (Cl. 177—225)

This invention relates to a platform type bathroom scale and more particularly to a novel lever structure and internal calibrating support whereby the weighing accuracy of the scale is greatly improved in a lightweight scale structure.

It has been an objective of scale manufacturers to make a lightweight platform type bathroom scale giving a wide range of weighing accuracy for persons such as children up through adults. In the past various sheet metal components have been utilized in such scales although the problem of the bending of such components has threatened to seriously limit the accuracy of scales that could be manufactured while obtaining the advantage of weight reduction. The present invention provides a novel structure wherein the weight of a finished scale of the type herein specified is at a minimum yet weighing accuracy is retained.

It is the principal object of this invention to provide a new and improved platform scale of the bathroom type.

Another object of this invention is to provide a simplified lever system within the scale.

Another object of this invention is to provide an improved calibrating structure for the weight-receiving levers.

Another object is to provide an improved supporting structure for the weight-receiving levers.

A further object is to provide a novel adjustment mechanism to bring the scale indicator to a zero position.

Other features, objects and advantages of the present invention will be obvious from the following description of the preferred embodiment illustrated in the accompanying drawings in which:

FIGURE 1 is a top plan view of a bathroom type scale having the invention therein with a portion of the platform removed to show a depending leg attached to the platform resting on a knife edge to support the platform;

FIGURE 2 is a fragmentary side elevational view of the scale taken from the lower or heel-placement portion of the scale looking toward the scale lens and showing the relationship between the lens, the depending platform skirt and the base of the scale;

FIGURE 3 is a fragmentary sectional view of the scale taken substantially as indicated along line 3—3 of FIGURE 1 illustrating the depending leg resting upon a knife edge which is positioned within the V-notch of a weight-receiving lever;

FIGURE 4 is a fragmentary sectional view taken substantially as indicated along line 4—4 of FIGURE 3 showing the relationship between the depending lever and the knife-edged metal hanger;

FIGURE 5 is a top plan view of a bathroom type scale having the invention herein with the weight-receiving platform removed and showing the internal structure of the scale;

FIGURE 6 is a sectional view taken substantially as indicated along line 6—6 of FIGURE 5 showing the relationship between the coil spring, the bell crank arrangement and the weight indicating dial;

FIGURE 7 is an enlarged fragmentary sectional view taken substantially as indicated along line 7—7 of FIGURE 6 and showing the bell crank arrangement; and FIGURE 8 is an enlarged fragmentary sectional view of the scale taken substantially as indicated along line 8—8 of FIGURE 6 and showing the mechanism for moving the pinion carriage and thereby obtaining a zero reading of the indicating dial.

Referring now to the drawings and more particularly to FIGURES 1 and 5, there is shown a preferred embodiment of the present invention. The platform type bathroom scale is provided with a base supporting a pair of cooperating weight-receiving levers. A decorative cover or platform fits telescopically over the base and is supported by the levers. A weight-indicating mechanism is provided which is responsive to the deflection of the levers and carries a dial which may be viewed through an opening in the cover as it passes a stationary datum line to indicate the amount of weight placed on the platform. A zeroing device brings the dial to a visible reading of zero with no weight on the platform.

In particular, the parts referred to above comprise a base, generally indicated at 10, formed as a stamped sheet metal member having an integral upstanding peripheral rim 11 with corner portions 12 of the rim facing and being generally normal to the direction of the levers which they support, as will be discussed later. The shape of the base may be chosen to make any particular scale design but is in the present instance as illustrated in FIGURE 1, generally rectangular. The sheet metal base is adapted to rest directly upon a floor or floor covering and support the mechanism of the scale therein. The mechanism support takes the form of upright slots 13 located in the four corner portions 12 of the base.

The weight sensing mechanism of the present scale consists of a pair of primary levers and a pair of secondary levers arranged in interconnected fashion and resting upon the upright slots at the corner portions of the base. A pair of primary levers, generally shown at 14, is joined to a common calibrating member or plate 15 adjacent one side of the base and diverges therefrom toward opposite adjacent corners of the base and is supported in the knife edge leg upright slots 13 in the base. The primary levers are each arranged on edge relative to the base and have an inverted V-notch across the thickness of the lever material to rest upon the upright slots 13 of the base.

Considerable weight saving is effected in the present scale structure by stamping the levers individually out of a sheet metal stock and then turning the levers on edge as illustrated in FIGURE 5. While the levers are quite thin, they have adequate strength in the vertical direction on the scales and the notches formed therein to receive the metal hangers and to rest upon the upstanding edges of the base may be quite accurately formed. The two primary levers 14 are mechanically secured to the common plate 15, thus joining the primary lever parts into a V-shaped single lever. The secondary levers are also preferably stamped out of sheet metal stock in similar fashion.

A pair of secondary levers, generally shown at 16, is also arranged on edge relative to the base and each of the secondary levers has an inverted V-notch portion 17 (FIGURE 3) which rests upon the knife-edge like upright slots in the base. The other end of each of the secondary levers is connected to and hangs below a primary lever 14 intermediate its ends by means of a bracket arrangement shown at 18. Each of the primary and secondary levers has a V-portion 19 located adjacent the corner portion which supports the lever and is adapted to support knife-edged metal hangers 20 which rest in the V-portion of each respective lever.

A platform 21 having a foot position section 21a, preferably constructed of an easily washable material, is provided with four depending legs 22 each having a V-shaped end portion 23 adapted to rest on the knife-edged metal hangers 20 supported on the weight-receiving levers as shown in FIGURE 3. The depending legs are attached to the platform by suitable clips 24. The platform has a depending skirt 25 at its periphery which extends over the base 10 hiding most of it from view.

The platform 21 provides a weight-receiving surface upon which a person may stand. The weight is transferred by the metal hangers 20 to the levers causing the levers and calibrating plate 15 to move toward the base. A transparent magnifying lens 26 is carried on the platform 21 through which a weight-indicating dial 27 may be viewed. The weight sensed may be read as that amount shown on the dial under an indicia marker 28 carried on the platform. A handle 29 is attached to the platform for ease of manipulation, if it is desired to store the scale in an upright position.

The weight-indicating mechanism is mounted on a channel support 30 secured to the base at a position generally centrally located on the base. The mechanism includes a weight-indicating dial 27 supported upon a disc 31 turned by a shaft 32 which is part of and rotated by a pinion gear 33. The pinion gear 33 is turned by a substantially horizontally extending rack 34 which is pivotally secured to a bell crank lever 35. The bell crank 35 comprises a generally U-shaped bracket pivotally supported on a rod 36 extending transversely through the bell crank sides and pivotally journalled in a support member 37. The rack 34 is pivotally connected at 38 to the lower end of the bell crank to move with movement of the bell crank and is held in engagement with pinion gear 33 by means of a spring 39 connected at 40 to the channel support 30 for the indicating mechanism and connected at 41 to the rack 34. The channel support 30 is anchored to the base only at its ends and supports the described mechanism out of contact with the base. Distortions in the base due to weight of a person on the scale thus has little or no effect on the read out mechanism.

The weight-receiving levers 14 and 16 are accurately counterbalanced by and attached to the calibrating plate 15. The front portions 14a of the primary levers are firmly secured to the calibrating plate 15 with teeth 14b. A coiled tension spring 42 is mounted upon a swivel post 43 which is loose and capable of moving and the bottom coils of the spring 42 threadably support the calibrating plate 15. The swivel post 43 has a slot 44 across its upper end for receiving and supporting the top end of the coil spring. The swivel post 43 extends through the calibrating plate and the spring and has a pivotal connection 45 (FIGURE 6) to the base for permitting limited swinging of the post about the connection as a pivot laterally and longitudinally of the base.

The primary levers are machine produced and in such operation there is bound to be a small variation in the length of the levers between the rigid connection to the calibrating plate and the knife edge for resting on the rim. Also, in forming the sheet metal base, the upstanding rim may not always be the same distance from the post from scale to scale manufactured. The swivel post, however, automatically compensates for any such small length variation because the top of the post can adjust itself automatically so that the primary levers are always resting on their knife edges. Also, the movement of the post minimizes any binding in the lever system that might result as the levers move up and down in response to weight placed on the scale. Furthermore, the threading of the spring around the calibrating plate and the support of the top of the spring in the post slot provide a finite effective length of the spring coil which permits accurate factory calibration of each spring to its particular levers, platform, pivot points, etc. through an adjusting screw turning of the post and spring which rotates the post to give the desired effective length of the spring. This adjustment is accomplished during the manufacture of the scale and once the spring is adjusted and because of the novel arrangement in this structure, no other spring adjustment is necessary during the life of the scale.

An upstanding ear 47 is integral with the calibrating plate 15 and forms a bearing under the bell crank lever 35 assuring that deflection of the levers allows movement of the bell crank and the indicating mechanism therewith. Thus, the levers and the spring are mounted in the scale independently of the indicating mechanism. The only connection between the two is the abutting contact of the upstanding ear 47 with the bell crank lever 35.

The intermediate portion of the coil spring 42 is seated upon two triangularly shaped blocks 48 and 49 on the plate 15 which help retain the effective length of the spring. These blocks in effect provide knife edges against the coils of the spring. As mentioned above, the calibration of the scale, once accomplished, will remain accurate throughout the useful life of the scale.

As shown in FIGURES 5 and 6, the indicating mechanism channel support 30 extends substantially the entire length of the scale and has a carriage 50 slidably supported within it. A spindle 51 connected to the carriage at 52 and terminating in a knob 53 positioned outside of the base moves the carriage and causes it to shift longitudinally of the base in slots 54 as guide members 55 move therein. Since the carriage supports the pinion gear 33, any turning of the knob 53 moves the threaded portion 56 of the spindle longitudinally and the carriage automatically changes the position of the pinion relative to the rack and also turns the indicating dial 27. Spring 57 around the spindle 51 prevents any backlash when the dial is turned and therefore holds the pinion in a solid non-moving position to which it is adjusted. Thus, the pinion carriage moves longitudinally of the rack and independently of the base and can adjust the indicating dial to a visual zero reading without weight being on the scale. The movement of the indicating dial in no way affects the lever system and calibrating system of the scale as they do not move while the carriage and indicating dial are being adjusted.

The foregoing detailed description has been given for clearness of understanding only and no unnecessary limitations should be understood therefrom for some modifications will be obvious to those skilled in the art.

I claim:

1. In a platform type bathroom scale having an interconnected sheet metal base, primary and secondary levers and a platform; calibrating structure for the levers, comprising: a calibrating coil spring attached to the primary lever for providing proportional deflection of the levers toward the base responsive to weight placed on the scale platform; a support for the spring including an upstanding post bearing on said base and extending upwardly through said coil spring, said post having a slot across its upper end to receive and support one end of said coil spring and being rotatable to provide for adjustment of the effective length of the coil spring between said upper end of the post and the attachment of said spring to the primary lever.

2. A scale as specified in claim 1 wherein said post is attached to the base with a connection permitting limited swinging of the post about the connection as a pivot laterally and longitudinally of the base, said swinging movement of the post automatically supporting said calibrating spring in position to in turn support said levers in proper relation to said scale base.

3. A platform type bathroom scale, comprising: a sheet metal base, weight sensing levers bearing upon said base and supporting a weight receiving platform, a coil calibrating spring for yieldably supporting said levers, an upstanding post attached to said base having a slot at the top to receive the upper end of the coil spring and support at least one end of said coil spring, a calibrating plate secured to one of the levers and having an opening about and out of contact with said upstanding post, said calibrating plate being threadably supported in said calibrating spring to support said levers on said post and provide for deflection of the levers in proportion to weight placed on the platform.

4. A platform type bathroom scale, comprising: a sheet metal base, weight sensing levers bearing upon said base, a weight receiving platform bearing on said levers, a coil calibrating spring supporting said levers above the base, an upstanding post attached to said base and having a slot at its upper end to receive and support the upper end of the coil spring, said levers having a plate threadable into said spring to provide a finite effective length of spring coil between said plate and said slot support on the post, said post having a bearing on said base with pivoting of the post to allow limited movement of the upper end accommodating proper seating of the levers on said base, said post extending upwardly through said spring and said calibrating plate without contact with said calibrating plate, and an indicating mechanism responsive to movement of the levers for visual indication of weight measure.

5. In a bathroom scale having an interconnected sheet metal base, primary and secondary levers and a platform, lever construction, comprising: a pair of sheet metal primary lever members each arranged on edge relative to the base, said primary members being joined to a common calibrating member adjacent one side of the base and diverging therefrom toward opposite adjacent corners of the base, said base having upstanding portions at each corner thereof of the thickness of said base sheet metal to provide a knife-edge like support for the levers, said primary lever members having an inverted V-notch across the thickness of the lever material to rest upon said base knife-edge supports; and a pair of secondary sheet metal lever members each arranged on edge relative to the base, each said secondary member having an inverted V-notch therein to rest upon said base knife-edge like support and having means for connection to the primary lever members intermediate their ends, said levers and base providing support for the platform.

6. A bathroom scale as specified in claim 5 wherein the sheet metal base has an integral upstanding rim and said lever member inverted V-notches rest and pivot upon a portion of said upstanding rim adjacent the corner portions of said base.

7. A bathroom scale as specified in claim 5 wherein the common calibrating member is supported from said base by a calibrating spring and said spring and calibrating member are movable laterally and longitudinally relative to said base in amounts insuring registry of said lever member inverted V-notches with said knife-edge like supports.

8. A platform type bathroom scale, comprising: a sheet metal base, weight sensing levers bearing upon said base and supporting a weight receiving platform, an indicating mechanism having a rotatable weight indicator for visual indication of weight measure, a pinion carriage with a pinion upright therein, a rack movable longitudinally in response to depression of said weight sensing levers and connected to said pinion for turning the same and said weight indicator, and a zero adjustment for adjustably turning the rotatable weight indicator to bring a zero reading opposite a stationary datum without weight placed on the platform including means for moving said pinion carriage longitudinally of said rack and independently of said base.

9. A platform type bathroom scale, comprising: a sheet metal base having an upstanding peripheral rim, weight sensing levers supported on said base peripheral rim, said levers being constructed of sheet metal and having a sharp knife-edge across the thickness of the metal resting directly on a portion of said upstanding peripheral rim and pivoting on said rim, the peripheral rim of the scale base rim being provided in its corner portions with upright slots receiving the ends of the levers and retaining the levers against lateral movement off the rim in the direction of the rim extent, a weight receiving platform supported on said levers, and an indicating mechanism having a rotatable indicator for visual indication of weight measure.

10. A platform type bathroom scale, comprising: a sheet metal base having an upstanding peripheral rim, weight sensing levers supported on said base peripheral rim, said levers being constructed of sheet metal and having a sharp knife-edge across the thickness of the metal resting directly on a portion of said upstanding peripheral rim and pivoting on said rim, a weight receiving platform supported on said levers, and an indicating mechanism having a rotatable indicator for visual indication of weight measure, said indicating mechanism including a carriage slidably supported in the base and shiftable longitudinally of the base relative to said levers, said carriage supporting said rotatable indicator whereby movement of the carriage relative to the base may turn the dial to a visual zero reading without weight on said scale.

References Cited in the file of this patent
UNITED STATES PATENTS

| | | |
|---|---|---|
| 1,611,569 | Strachan | Dec. 21, 1926 |
| 2,232,830 | Sutton | Feb. 25, 1941 |
| 2,255,110 | Garbell | Sept. 9, 1941 |
| 2,664,287 | Sutton | Dec. 29, 1953 |
| 2,875,999 | Provi et al. | Mar. 3, 1959 |
| 2,949,288 | Provi | Aug. 16, 1960 |
| 2,960,329 | Hanssen | Nov. 15, 1960 |
| 2,969,229 | Krups | Jan. 24, 1961 |